May 12, 1953

W. M. CORBITT ET AL
ORGANIZATION FOR FEEDING HEAVY
SHEETS, PLATES, AND THE
LIKE ON TO A CONVEYER 2,638,234

Filed Sept. 8, 1949

INVENTORS.
WILLARD M. CORBITT
AND ELMER C. WENNING.
BY
Allen & Allen
ATTORNEYS.

May 12, 1953

W. M. CORBITT ET AL 2,638,234

ORGANIZATION FOR FEEDING HEAVY
SHEETS, PLATES, AND THE
LIKE ON TO A CONVEYER

Filed Sept. 8, 1949

INVENTORS.
WILLARD M. CORBITT
AND ELMER C. WENNING.
BY Allen & Allen
ATTORNEYS.

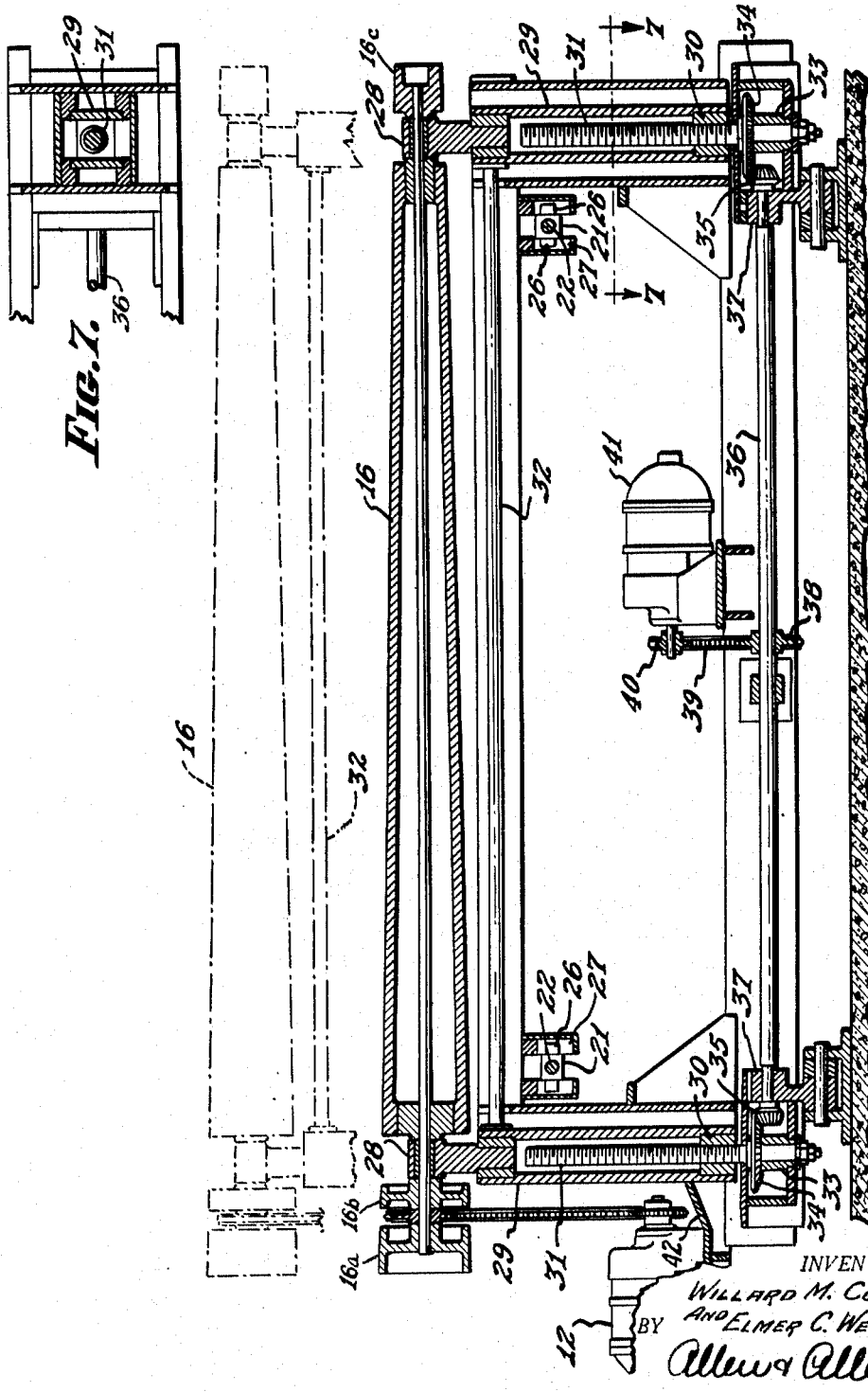

Patented May 12, 1953

2,638,234

UNITED STATES PATENT OFFICE 2,638,234

ORGANIZATION FOR FEEDING HEAVY SHEETS, PLATES, AND THE LIKE ONTO A CONVEYER

Willard M. Corbitt and Elmer C. Wenning, Ashland, Ky., assignors to Armco Steel Corporation, Middletown, Ohio, a corporation of Ohio Application September 8, 1949, Serial No. 114,514

6 Claims. (Cl. 214—1)

This is a continuation-in-part of our copending application of the same title, Serial No. 19,536, filed April 6, 1948, and now abandoned.

This invention relates to an organization for feeding heavy sheets, plates and the like on to a conveyor. It is particularly useful in connection with the so-called shear lines in steel mills or the like. An exemplary shear line will comprise a conveyor upon which the sheets or plates are placed and which feeds them successively to a roller leveler parallel to a skew table and to one or more of a break-down shear, a side shear, double end cut shear, multiple shear gauge, reject table and piling machine. Where relatively light thin sheets are being handled the problem of removing them from a stack onto a conveyor to start them into the shear line is not a difficult one, but when heavy sheets or plates are being handled the problem becomes very severe. From about 16 gauge on up and with plates varying in length from 80 inches to 300 inches and in width from 30 inches to 60 inches, it often happens that a pile of plates will comprise individual plates weighing as much as 1,000 pounds.

In the past unskilled labor has been employed to lift the individual heavy sheets or plates from a pile on a loading table or the like, on to a traveling conveyor which then conducts the sheets or plates to one or more of the apparatuses in the shear line.

In most steel plants a loading table is provided on each side of the conveyor and sheets or plates may be loaded alternately from one side and the other, and in the past it has been found to require two or more men to handle the plates on each side of the conveyor. This work is dangerous to personnel and is, of course, very unpleasant work.

With the foregoing considerations in mind it is an object of our invention to provide an organization whereby one man is able to perform the operation of loading sheets or plates from a load table on to a conveyor with a minimum of effort and with greater speed.

It is another object of our invention to provide such an organization by means of which the work may be done more rapidly, so that production can be increased, with a consequent saving in costs.

Further objects of our invention include the provision of such an organization which is relatively simple in construction and which is very flexible so that a wide variety of sizes of sheets and plates can be handled.

This and other objects of our invention which we shall describe hereinafter in more detail, or which will be apparent to one skilled in the art upon reading these specifications, we accomplish by that certain construction and arrangement of parts of which we shall now describe an exemplary embodiment.

Reference is made to the drawings forming a part hereof and in which:

Figure 6 is a cross-sectional view of the same taken on the line 6—6 of Figure 5.

Figure 7 is a cross-sectional view taken on the line 7—7 of Figure 6.

Figure 1:
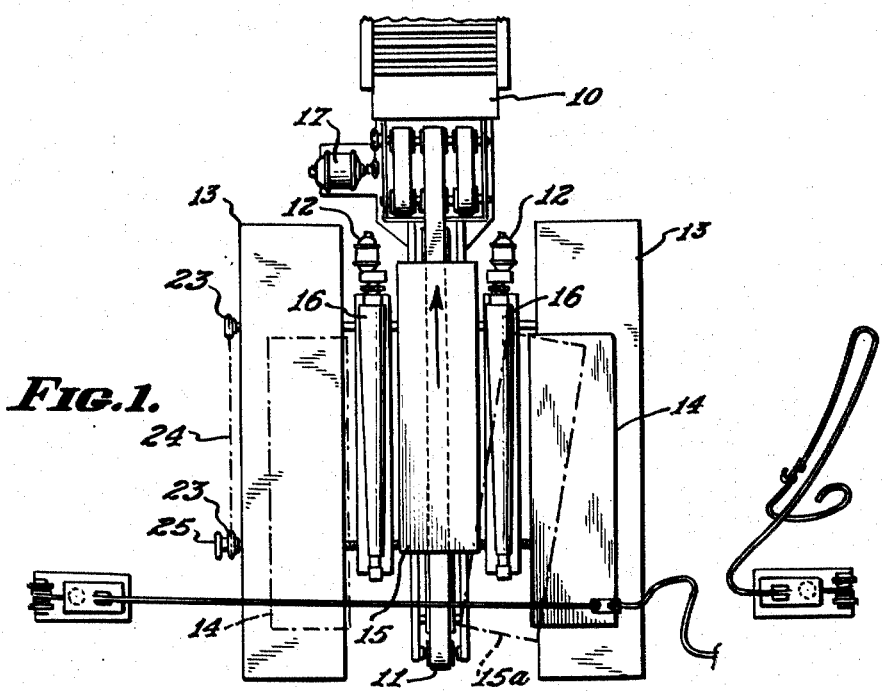
Figure 1 is a plan view of a typical organization according to our invention.

In the figures, and particularly in Figure 1, the start of the shear line is indicated generally at 10. A lead-in conveyor of conventional form is indicated at 11 and is driven by an electric gear motor as at 17. We have shown on each side of the lead-in conveyor 11 a loading table 13 upon which stacks of sheets or plates 14 are placed and from which individual sheets or plates are moved onto the conveyor 11 as indicated at 15.

Figure 2:
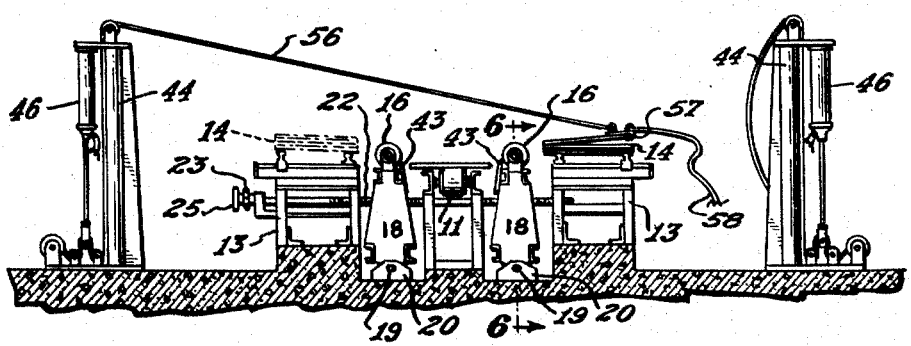
Figure 2 is an end elevational view of the same.

Between each loading table 13 and the conveyor 11 we have provided a tapered roller indicated generally at 16. These rollers are mounted with their axis substantially parallel to the direction of movement of the conveyor 11 and with their larger ends in the direction of motion of the conveyor. The taper of these rollers is not critical, but it should be such that when a sheet or plate is being moved from a loading table across the tapered roller, as indicated in broken lines at 15a, the sheet or plate will be contacted by the roller intermediate its length. The rollers 16 are driven by means of gear motors 12 in such a direction that their upper surfaces are moving inwardly toward the conveyor 11. In other words, as seen in Figure 2 the left hand roller 16 is rotating clockwise and the right hand roller 16 is rotating counterclockwise. In actual practice we have found that the peripheral speed of the rollers 16 should be about 150 feet per minute. The conveyor 11 in normal practice travels about 175 feet per minute.

Figure 5:
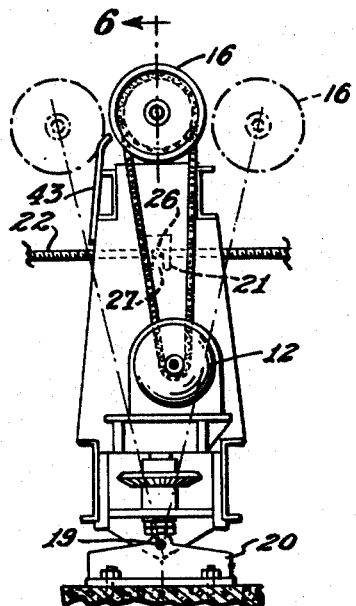
Figure 5 is an end elevational view on a greatly enlarged scale of one of the tapered roller housings.

In order that this organization be capable of handling sheets and plates of various sizes, and stacks of various heights, provision has been made for their adjustability. Thus, as best seen in Figures 2 and 5, the rollers are mounted in housings 18, and the housings 18 are pivoted as at 19 upon a supporting structure 20. Thus the housings 18 can be rocked toward and away from the conveyor 11, so that the conveyor 11 may handle sheets or plates of different widths.

Mounted in each of the housings 18 are the nuts 21 which engage the lead screws 22. There are preferably two such lead screws, one toward each end of the organization, and these screws are provided with oppositely threaded portions one of which engages a nut 21 in one housing 18, and the other of which engages a nut 21 in the other housing 18. Thus, when a screw 22 is turned, the housings 18 are rocked in opposite directions; that is, either toward each other or away from each other. Each of the screws carries at one end a sprocket 23 and these sprockets are connected by a chain 24. One of the screws 22 is conveniently provided with a hand-wheel 25. Thus, when the hand-wheel 25 is turned both screws 22 are rotated and in this way the rollers 16 are mounted in parallelism while being moved toward or away from each other. The nuts 32 are provided with bosses 26 which are arranged to ride in the slots 27 so as to take care of the vertical displacement resulting from the slight arcuate movement of the housing when it is rocked.

Means are also provided for adjusting the rollers 16 vertically, as best seen in Figure 6. The rollers 16 are journaled in bearings 28 and the journals are supported in the columns 29. Secured to the columns 29 are the nuts 30 which engage the screws 31. Thus, when the screws 31 are rotated the nuts 30 riding up on the screws 31 carry with them columns 29 and the journals 28. The columns 29 may be connected by a bracing member 32. The screws 31 are journaled as indicated at 33 and carry the bevel gears 34. The bevel gears 34 mesh with the bevel pinions 35 mounted on the shaft 36, which is journaled as at 37. The shaft 36 carries a sprocket 38 which is driven by a chain 39 from the sprocket 40 on the shaft of the gear motor 41. In this way, the rollers 16 may be raised or lowered as required by actuation of the motor 41 in one direction or the other. The gear motor 42 for driving the roller 16 is mounted on a platform 42 which is secured to a portion of the structure which rises with the roller so that the relationship between the gear motor 42 and the roller 16 is not changed by the vertical adjustment.

It will be noted that the rollers 16 are provided with the extensions 16a, 16b and 16c. The purpose of these extensions is to prevent scratches or blemishes on the sheet, particularly when handling light gauge material, where the sag is on a relatively sharp bend. In such case, the edges of the sheet could drag across the bearings 28 or across the sprocket which drives the tapered roller 16, producing objectionable defects in the sheet. In Figure 6, the extensions 16a and 16b protect the sheet from the sprocket, while the extensions 16b and 16c together with the roller 16 itself, protect the sheet from the bearings 28.

The purpose of making the rollers 16 vertically adjustable is to facilitate the loading of a plate or sheet from a loading table onto the conveyor 11, and preferably the rollers 16 are maintained in such relation with the stack on the loading table that the plane of the top sheet or plate of the stack intersects the upper surface of the roll intermediate its ends.

The purpose of lateral adjustability of the roller 16 is to permit different widths of sheets or plates to be handled. For example, if wider sheets are to be handled the rolls 16 must be moved apart, while with narrower sheets these rolls may be moved closely together. It will be observed that each of the housings 18 is provided with a butt plate 43 on the conveyor side of the roll. This is to assist in the alignment of sheets or plates moved on to the conveyor from the opposite side.

Figure 4:
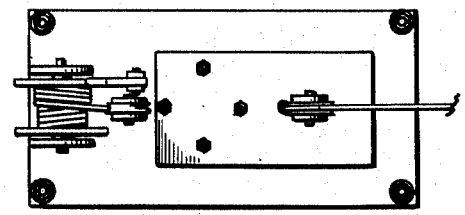
Figure 4 is a plan view of the same.
Figure 3:
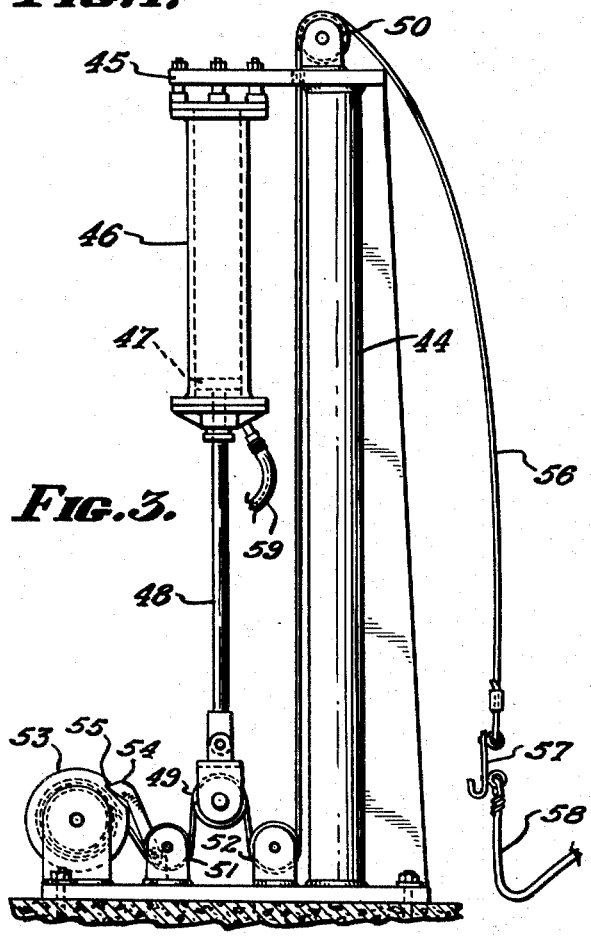
Figure 3 is an elevational view of one of the jacking means on a greatly enlarged scale.

To facilitate the moving of a heavy sheet or plate we have provided jacking devices such as are shown in detail in Figures 3 and 4. We have shown a column 44 having a bracket 45 on which is supported a pneumatic cylinder 46 within which moves a piston 47 having a rod 48. While we have shown a pneumatic arrangement, it will be clear that this arrangement could also be hydraulic or of any other desired construction. A pulley 49 is secured to the end of the piston rod 48 and a pulley 50 is provided at the top of the column 44. Pulleys 51 and 52 are secured to the base, as is also a reel 53 which is preferably provided with a pawl 54 engaging in a notch 55 to prevent rotation. A cable 56 is threaded from the reel 53 under the pulley 51, over the pulley 49, under the pulley 52, and over the pulley 50. A hook 57 is suitably secured to the end of the cable 56 and a retrieve cord 58 is also secured to the hook 57. The cylinder 46 is provided with the usual fluid line 59. It will be clear that when fluid is admitted to the cylinder 46 through the line 59, the piston 47 will be raised, carrying with it the pulley 49. Since the reel 53 cannot rotate because of the arrangement at 54 and 55, the hook 57 will be subject to a tensile force.

In use, as shown in Figure 2, the hook 57 is inserted under the top sheet or plate to be loaded by use of a pinch bar or the like so that when the fluid is supplied to the cylinder 46 the top sheet or plate from the right-hand stack in Figure 2 is swung to the left to the position approximately shown at 15 in Figure 1. As this sheet or plate is drawn on to the tapered roller 16 the tapered roller picks the forward end of the sheet up and swings it inward toward the conveyor. Since the peripheral speed at the forward end of the roller 16 is greater because of the larger diameter, the sheet or plate will be substantially straightened out longitudinally of the conveyor as it is dropped on to the conveyor. The operator holds on to the retrieve cord 58 so that he can retrieve the hook at the end of the operation. The operator will have conveniently within reach a foot switch or the like to control the admission of fluid to the cylinder 46 and will also have conveniently at hand controls for the adjustment of the rolls 16 vertically and laterally.

With this organization it is possible for two men to operate from two stacks alternately, or, if desired, one man may operate from one stack and when he has finished with that he may cross over and operate from the other side in the same manner. His work is not only simplified, but rendered much less strenuous than heretofore.

While we have shown an organization with loading table on both sides of the conveyor, and with two jacking devices, it will be clear that the benefits of the invention may be obtained with only one loading table on one side of the conveyor and one tapered roller between the loading table and the conveyor, and one jacking device at the opposite side of the conveyor. It will also be clear that numerous other jacking devices of known form could be substituted for the ones shown, and that these have thus been shown by way of example only. It will also be understood that in the case of lighter sheets the use of the jacking devices may be unnecessary.

Having now fully described our invention, what we claim as new and desire to secure by Letters Patent is:

1. A feeding organization for metal sheets, plates and the like, comprising in combination a conveyor, a loading table beside said conveyor, a tapered roller between said conveyor and said table, said roller being disposed with its axis parallel to said conveyor and with its larger end in the direction of movement of said conveyor, means for driving said roller with its surface moving toward said conveyor, and a jacking device located at the end of said organization corresponding to the smaller end of said roller on the opposite side of said conveyor from said loading table, said jacking device comprising means for engaging an edge of a sheet, plate, and the like, and means for applying a tensile force to said engaging means, to shift an end of a sheet, plate, or the like from said table in the direction of said conveyor.

2. An organization according to claim 1, in which said jacking device comprises a fluid cylinder having a piston therein, and a cable connecting said piston and engaging means.

3. A feeding organization for metal sheets, plates and the like, comprising in combination a conveyor, a loading table beside said conveyor, and a tapered roller between said conveyor and said table, said roller being disposed with its axes parallel to said conveyor and with its larger end in the direction of movement of said conveyor, and means for driving said roller with its upper surface moving toward said conveyor, said roller being provided with bearing means and extensions of said roller being provided in connection with said bearing means and said driving means to protect sheets, plates or the like moving over said roller from said bearing and driving means.

4. A feeding organization for metal sheets, plates and the like, comprising in combination a conveyor, a loading table on each side of said conveyor, a tapered roller between said conveyor and each of said loading tables, said rollers being disposed with their axes parallel to said conveyor and with their larger ends in the direction of movement of said conveyor, means for driving said rollers with their upper surfaces moving toward said conveyor, and jacking devices located at the end of said organization corresponding to the smaller end of said rollers, on the opposite side of said conveyor with respect to the loading table with which they coact respectively, said jacking devices comprising means for engaging an end of a sheet, plate and the like, and means for applying a tensile force to said engaging means, to shift an end of a sheet, plate, or the like from said table in the direction of said conveyor.

5. An organization according to claim 4 in which each of said jacking devices comprises a fluid cylinder having a piston therein, and a cable connecting said piston and the respective engaging means.

6. A feeding organization for metal sheets, plates and the like, comprising in combination a conveyor, a loading table on each side of said conveyor, and a tapered roller between said conveyor and each of said loading tables, said rollers being disposed with their axes parallel to said conveyor and with their larger ends in the direction of movement of said conveyor, and means for driving said rollers with their upper surfaces moving toward said conveyor, said rollers being provided with bearing means and said rollers having extensions to protect sheets, plates or the like passing over said rollers from said bearing means and driving means.

WILLARD M. CORBITT.
ELMER C. WENNING.

References Cited in the file of this patent

UNITED STATES PATENTS

| Number | Name | Date |
|---|---|---|
| 445,290 | Treat | Jan. 27, 1891 |
| 504,932 | Mook | Sept. 12, 1893 |
| 1,105,256 | Casto | July 28, 1914 |
| 1,723,505 | Goodfellow | Aug. 6, 1929 |
| 1,844,385 | Goldsmith | Feb. 9, 1932 |
| 1,890,250 | Evans et al. | Dec. 6, 1932 |
| 1,909,481 | Allen | May 16, 1933 |
| 2,567,335 | Hebert | Sept. 11, 1951 |

FOREIGN PATENTS

| Number | Country | Date |
|---|---|---|
| 517,237 | France | June 16, 1920 |